UNITED STATES PATENT OFFICE.

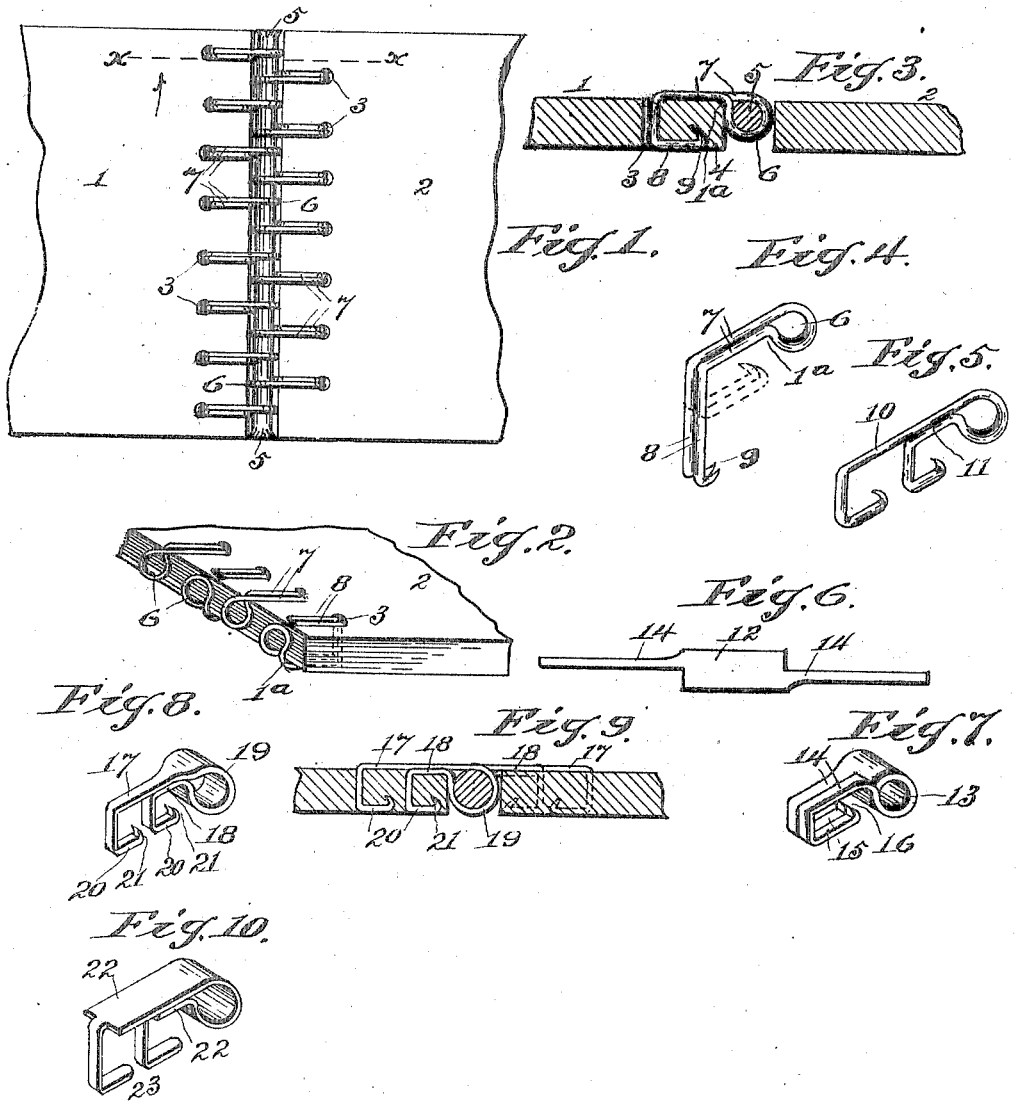

JOHN MILLAR, OF CINCINNATI, OHIO.

BELT-FASTENER.

No. 817,501.   Specification of Letters Patent.   Patented April 10, 1906.

Application filed July 26, 1905. Serial No. 271,201. (Model.)

*To all whom it may concern:*

Be it known that I, JOHN MILLAR, a citizen of the United States, residing at Cincinnati, in the county of Hamilton and State of Ohio, have invented certain new and useful Improvements in Belt-Fasteners, of which the following is a specification.

This invention relates to belt-fasteners, and pertains especially to the class of hinge-fasteners employing looped hooks and a pin connecting the hooks.

The prime object of the invention is to provide a hinge-fastener which shall show as little of the fastener upon the inner side of the belt as possible, whereby frictional bearing of the fastener on the belt-pulleys may be lessened or entirely prevented, and which shall be of such construction as not to interfere with the flexibility of the adjoining belt ends nor with the passage of the belt-joint over pulleys, and especially pulleys of small size and crown-pulleys.

In the accompanying drawings, forming part of this application, Figure 1 is a face view of a portion of a belt the adjacent ends of which are connected by a fastener constructed in accordance with my invention. Fig. 2 shows the hooks alternating the sides of a belt. Fig. 3 is an enlarged section on the line $xx$, Fig. 1. Fig. 4 is a detail perspective view of one of the hooks ready to be applied to a belt, showing in dotted lines its fixed position. Fig. 5 is a similar view showing a modified arrangement of arms of the preferred form of hook. Fig. 6 is a plan view of a blank from which a further modified form of hook is made. Fig. 7 is a perspective view of a hook shaped from the blank shown in Fig. 6. Fig. 8 is a perspective view of a plate-hook, showing a further modification. Fig. 9 is a sectional view of part of a belt, showing the application of the hook shown in Fig. 8. Fig. 10 is a perspective view of a still further modification.

The same reference-numerals denote the same parts throughout the several views of the drawings.

The belt ends 1 and 2 each have a single line of eyes 3 adjoining the edges of the belt, so that only a short length of belt material 4 intervenes between said edges and the eyes.

The preferred form of fastener, as shown in Figs. 1, 2, 3, and 4, consists of two sets of hooks, one set being carried by the belt end 1 and the other set by the belt end 2, and a suitable pin or key 5, preferably of rawhide, to afford flexibility. All the hooks of each set being of the same construction, only one hook will be herein described in detail. It consists of a single piece of suitable wire having a central circular loop 6, the wire portions being extended laterally from the loop side by side and on a line out of the central plane of the loop a distance equal to the belt material 4 to form arms 7, the latter being bent at right angles side by side to form arm portions 8, adapted to be projected through the eyes 3. These arm portions terminate together in clenching-points 9, and said arm portions after being passed through eyes from the face or outer side of the belt are turned back on the inner side of the belt toward the loop a distance preferably equal to about half the length of the arms 7, where the points 9 are clenched into the belt, so as to leave a minimum of belt material between the belt end and the said points. A shoulder $1^a$ is formed at the intersection of one arm and the loop. The arm portions 8 are stamped or pressed int the belt substantially flush with the inner f. e of the belt, and they are of such short i gth as to reduce their contact with a pulley to a minimum degree, whereby friction between said parts is obviated. The loops are smaller in diameter than the thickness of the belt and are placed to stand out of the plane of the inner surface of the belt. This arrangement affords free flexibility of the adjoining belt crosswise the latter, whereby the belt joiner or fastener may adapt itself to pulleys of various character and form.

The arrangement of the hooks, as shown in Fig. 2, represents the hooks as alternating in reversed position, so that either side of the belt may be run next to a pulley.

In Fig. 5 is shown the same hook, except it has a long arm 10 and a short arm 11. These arms may be made to pierce the belt without providing the latter with eyes.

Referring to the modification shown in Figs. 6 and 7, the hook is struck from a metal plate the body 12 of which forms a loop 13, whence the arms 14 project edge to edge and at right angles to form arm portions 15, adapted to be projected toward the loop on the inner side of a belt and have inturned clenching-points 16.

The modification shown in Figs. 8 and 9 represents a hook formed of suitable plate or sheet metal with a long arm 17 and a short arm 18, both extending from a loop 19, said arms adapted to pierce a belt and be turned back on the inner side of the belt to form arm portions 20, provided with clenching-points 21.

In Fig. 10 is shown a plate-hook similar to the one just described, except the arms 22 have reduced arm portions 23, which are without clenching-points.

It will be observed that in all the forms shown and described there is a shoulder formed by and between one of the arms and its loop, against which shoulder the joining ends of the belt abut, so that the loops stand close against the belt ends, and the space between said ends is reduced to a minimum.

It is obvious that in the manner of affixing any of the hooks herein referred to they have a double anchorage with the belt and their fixture is assured.

Having thus described my invention, what I claim as new, and desire to secure by Letters Patent, is—

1. A belt-fastener comprising a set of hooks, each hook being made of a single piece of metal to form a loop, a pair of arms projecting in the same direction from the top of the hook, an arm portion extending from each of said arms under the latter toward the loop and terminating in clenching-points, and a suitable pin extending through the loops to connect the hooks.

2. A belt-fastener comprising two sets of independent loops, a pair of arms projecting side by side in the same direction from their loop, a pair of arm portions extending side by side under said arms toward said loop and terminating in a pair of inturned clenching-points, and a suitable pin extending through the loops to connect them.

3. In a belt-fastener, the combination, with a suitable key, of the hooks reversed alternately on the belt and having loops intervening the adjoining belt ends, arms extending from the loops on one side of the belt, through the latter, arm portions extending toward the loops on the opposite side of the belt and terminating in inturned piercing-points.

In witness whereof I hereunto set my hand in the presence of two witnesses.

JOHN MILLAR.

Witnesses:
J. ROSS COLHOUN.
L. E. MONEY.